US007908131B1

(12) United States Patent
Li et al.

(10) Patent No.: US 7,908,131 B1
(45) Date of Patent: Mar. 15, 2011

(54) METHOD FOR PARAMETERIZED MODEL ORDER REDUCTION OF INTEGRATED CIRCUIT INTERCONNECTS

(75) Inventors: Xin Li, Pittsburgh, PA (US); Peng Li, College Station, TX (US); Lawrence T. Pileggi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 750 days.

(21) Appl. No.: 11/554,887

(22) Filed: Oct. 31, 2006

(51) Int. Cl.
G06F 7/60 (2006.01)
G06F 17/50 (2006.01)
G06F 17/10 (2006.01)

(52) U.S. Cl. .............. 703/13; 703/2; 703/14; 703/16; 716/1; 716/2; 716/4; 716/5

(58) Field of Classification Search .............. 703/13, 703/2, 14, 16; 716/1, 2, 4, 5
See application file for complete search history.

(56) References Cited

U.S. PATENT DOCUMENTS

| | | | | | |
|---|---|---|---|---|---|
| 5,689,685 | A | * | 11/1997 | Feldmann et al. | 703/2 |
| 5,920,484 | A | * | 7/1999 | Nguyen et al. | 703/2 |
| 6,023,573 | A | * | 2/2000 | Bai et al. | 703/2 |
| 6,041,170 | A | * | 3/2000 | Feldmann et al. | 703/2 |
| 6,188,974 | B1 | * | 2/2001 | Cullum et al. | 703/14 |
| 6,308,304 | B1 | * | 10/2001 | Devgan et al. | 716/5 |
| 6,349,272 | B1 | * | 2/2002 | Phillips | 703/2 |
| 6,662,149 | B1 | * | 12/2003 | Devgan et al. | 703/14 |
| 6,687,658 | B1 | * | 2/2004 | Roychowdhury | 703/2 |
| 6,789,237 | B1 | * | 9/2004 | Ismail | 716/4 |
| 6,810,506 | B1 | * | 10/2004 | Levy | 716/2 |
| 7,017,130 | B2 | * | 3/2006 | Lee et al. | 716/5 |
| 7,216,309 | B2 | * | 5/2007 | Lee et al. | 716/2 |
| 7,228,259 | B2 | * | 6/2007 | Freund | 703/2 |
| 2004/0261042 | A1 | * | 12/2004 | Lee et al. | 716/2 |
| 2005/0021319 | A1 | * | 1/2005 | Li et al. | 703/2 |
| 2005/0096888 | A1 | * | 5/2005 | Ismail | 703/2 |
| 2006/0004551 | A1 | * | 1/2006 | Freund | 703/2 |
| 2008/0072182 | A1 | * | 3/2008 | He et al. | 716/2 |

OTHER PUBLICATIONS

Li et al. "Parameterized Interconnect Order Reduction with Explicit-and-Implicit Multi-Parameter Moment Matching for Inter/Intra-Die Variations", IEEE Aug. 2005.*
Cover page showing document property for NPL reference to Li. et al created date Aug. 7, 2005.*
Heres, Peter. "Robust and Efficient Krylov Subspace Methods for Model Order Reduction", 2005.*

(Continued)

*Primary Examiner* — Kamini S Shah
*Assistant Examiner* — Shambhavi Patel
(74) *Attorney, Agent, or Firm* — Withrow & Terranova, P.L.L.C.

(57) ABSTRACT

The present invention is a method and apparatus for creating a reduced-order IC interconnect model, which incorporates variations in interconnect process parameters, and models both on-chip and off-chip interconnects. The method is based on mathematically representing an IC interconnect system, including mathematical interconnect process parameter terms, which are manipulated to facilitate simplification of an IC interconnect model. The IC interconnect model is then simplified by using a mathematical technique called state-space projection. Specifically, an IC interconnect system is represented with at least one modified nodal analysis equation (MNA) that is based on frequency, interconnect process parameters are added and substituted back into the MNA(s), terms with interconnect process parameters are explicitly matched. A state-space projection is created, which implicitly matches frequency terms. The state-space projection is used to create the reduced-order IC interconnect model.

20 Claims, 6 Drawing Sheets

OTHER PUBLICATIONS

Shi et al. "Model-Order Reduction by Dominant Subspace Projection: Error Bound, Subspace Computation, and Circuit Applications", IEEE Transactions on Circuits and Systems—I: Regular Papers, vol. 52, No. 5, May 2005.*

Bai et al. "Krylov subspace techniques for reduced-order modeling of large-scale dynamical systems", Applied Numerical Mathematics 43 (2002) 9-44.*

Balk, Igor. "Arnoldy based passive model order reduction algorithm", 2000.*

"Passive Reduced Order Multi-port Models", IC Interconnect Analysis 2005.*

Kamon, et al. Generating Nearly Optimally Compact Models from Krylov-Subspace Based Reduced-Order Models, IEEE Transactions on Circuits and Systems—II: Analog and Digital Signal Processing, vol. 47, No. 4, Apr. 2000.*

Grimme, Eric. "Krylov Projection Methods for Model Reduction", 1997.*

Celik, Mustafa et al., IC Interconnect Analysis, 2002, Chapter 1 (pp. 12-19), Chapter 4 (pp. 119-152), Chapter 5 (pp. 153-180), Chapter 6 (pp. 181-242), Kluwer Academic Publishers, Boston, MA.

Daniel, Luca et al., "A Multiparameter Moment Matching Model Reduction Approach for Generating Geometrically Parameterized Interconnect Performance Models," IEEE Transactions on Computer-Aided Design of Integrated Circuits and Systems, May, 2004, pp. 678-693, vol. 23, No. 5, IEEE.

Heydari, Payam, and Pedram, Massoud, "Model Reduction of Variable-Geometry Interconnects Using Variational Spectrally-Weighted Balanced Truncation," IEEE/ACM International Conference on Computer-Aided Design, 2001, pp. 586-591, IEEE/ACM.

Liu, Ying et al., "Model Order-Reduction of RC(L) Interconnect Including Variational Analysis," IEEE/ACM Design Automation Conference, 1999, pp. 201-206, IEEE/ACM.

Odabasioglu, Altan et al., "PRIMA: Passive Reduced-Order Interconnect Macromodeling Algorithm," IEEE Transactions on Computer-Aided Design of Integrated Circuits and Systems, Aug. 1998, pp. 645-654, vol. 17, No. 8, IEEE.

Phillips, Joel et al., "Guaranteed Passive Balancing Transformations for Model Order Reduction," IEEE/ACM Design Automation Conference, Jun. 10-14, 2002, pp. 52-57, ACM, New Orleans, LA.

Wang, Janet et al., "Stochastic Analysis of Interconnect Performance in the Presence of Process Variations," IEEE/ACM Transactions on Computer-Aided Design of Integrated Circuits and Systems, 2004, pp. 880-886, IEEE.

* cited by examiner

METHOD FOR PARAMETERIZED MODEL ORDER REDUCTION OF INTEGRATED CIRCUIT INTERCONNECTS

FIELD OF THE INVENTION

The present invention relates to behavioral models of integrated circuits (ICs) used for simulation and analysis.

BACKGROUND OF THE INVENTION

As IC complexity increases, designers rely largely on simulation and analysis to verify and qualify IC designs. Accurate behavioral IC models are crucial for accurate simulation and analysis. With IC densities increasing such that line-widths are much less than one micron, random fluctuations in the manufacturing process introduce process variations in the fabrication of ICs. Process variations can be typically broken up into two levels: inter-die variations and intra-die variations. The inter-die variations can be modeled to address common variations across the die, while the intra-die variations can be modeled to address individual, but spatially correlated, local variations within the die. Both inter-die and intra-die process variations can significantly impact circuit performance, production yields, or both. Meanwhile, metal interconnects of integrated circuits are exerting greater influences on IC behavior; therefore, accurate interconnect models are needed. Variations in process parameters that influence interconnect behavior need to be included in the interconnect models. The process parameters may include width and thickness of the metal interconnects. Interconnect models including variational process parameters are called parameterized interconnect models. In large ICs, the number of interconnects can number in the hundreds of millions resulting in very large interconnect models for large ICs. Thus, there is a need to simplify and reduce the size of IC interconnect models, while retaining as much behavioral accuracy as possible. Such models are called reduced-order IC interconnect models and may be represented using matrix based vector equations.

The matrices of a parameterized reduced-order IC interconnect model with consideration of inter-die process variations only can be approximated as low-order polynomials of the process parameters; however, the matrices of a parameterized reduced-order IC interconnect model may be strongly non-linear in the presence of intra-die process variations. Therefore, using low-order polynomials of the process parameters for intra-die variations may not be feasible. Thus, there is a further need for a parameterized reduced-order IC interconnect model, which incorporates variations in interconnect process parameters including both inter-die and intra-die variations.

SUMMARY OF THE INVENTION

The present invention is a method and apparatus for creating a reduced-order IC interconnect model, which incorporates variations in interconnect process parameters including both inter-die and intra-die variations. The method is based on mathematically representing an IC interconnect system, including mathematical interconnect process parameter terms, which are manipulated to facilitate simplification of an IC interconnect model. The IC interconnect model is then simplified by using a mathematical technique called state-space projection. Specifically, an IC interconnect system is represented with at least one modified nodal analysis equation (MNA) that is based on frequency, interconnect process parameters are added and substituted back into the MNA(s), and terms with interconnect process parameters are explicitly matched. A state-space projection is created, which implicitly matches frequency terms. The state-space projection is used to create the reduced-order IC interconnect model. In one embodiment of the present invention, the interconnect system may be represented by more than one MNA equation. The interconnect process parameters may be added by creating a Taylor series expansion of each interconnect process dependent matrix in the MNA equation (s). The projection may include a Krylov subspace projection. The Krylov subspace projection may be created using an iterative method, such as an Arnoldi iteration.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
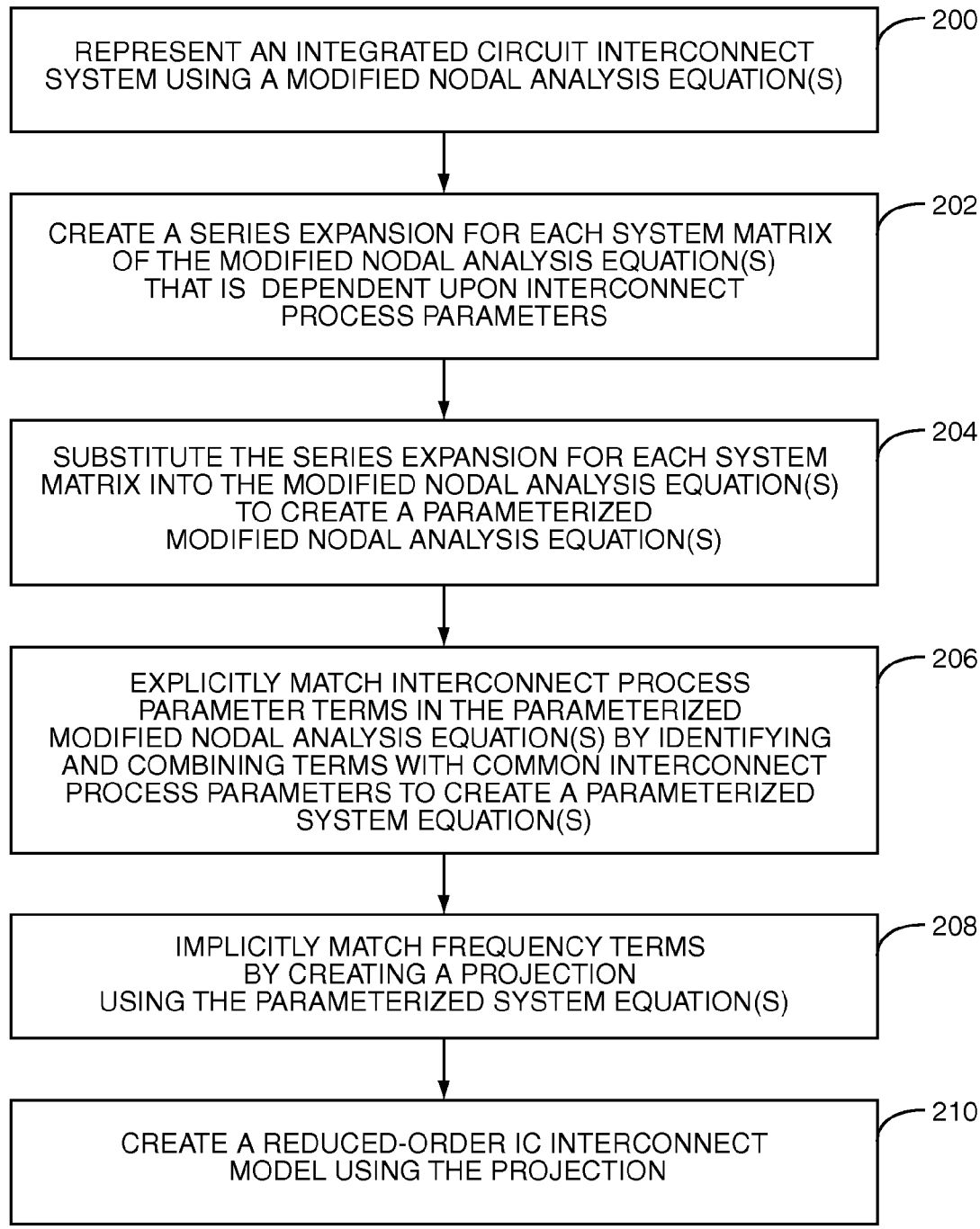

FIG. 2 presents a method for creating a reduced-order IC interconnect model.

Figure 3:
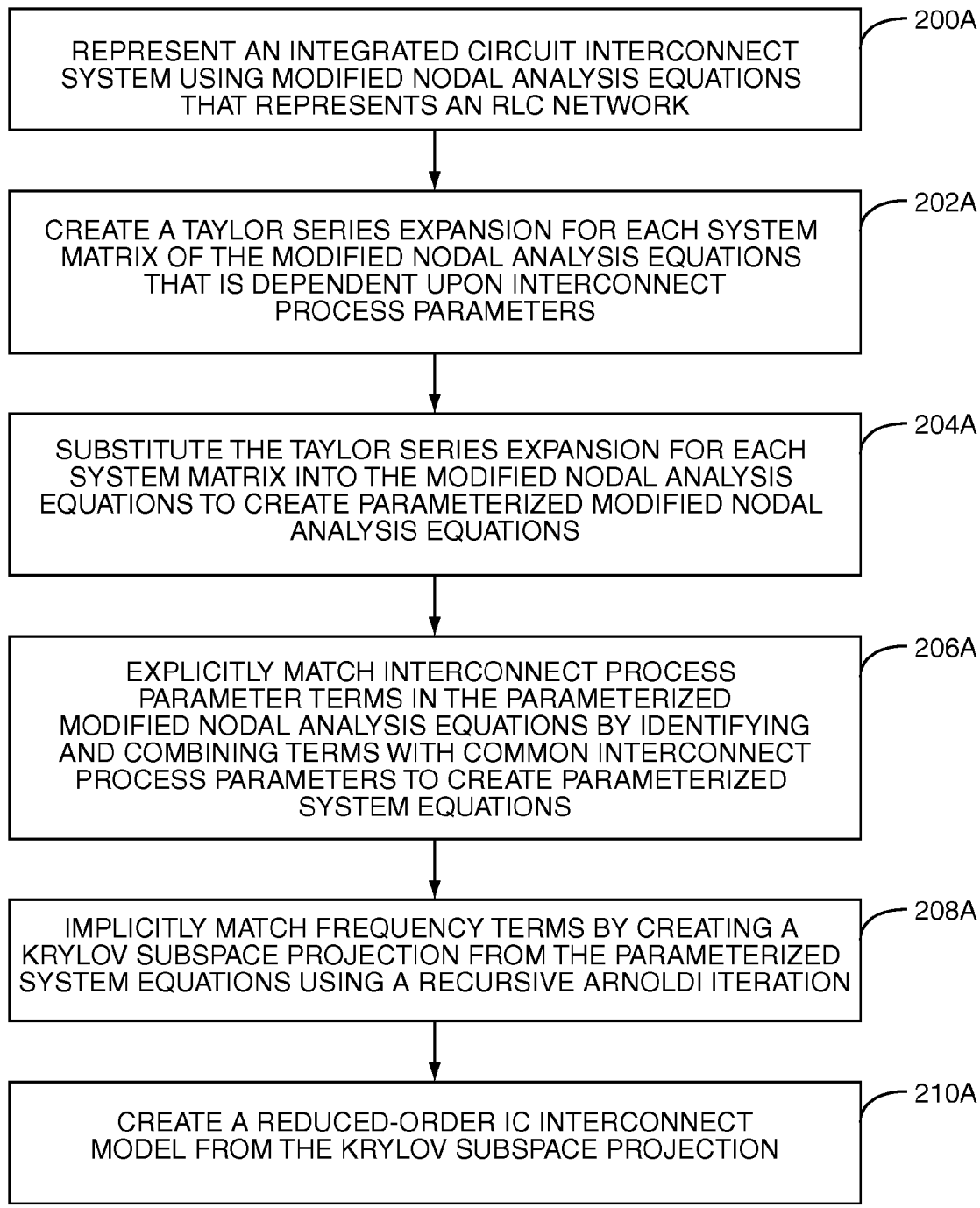

FIG. 3 shows an exemplary embodiment of the present invention.

Figure 4:
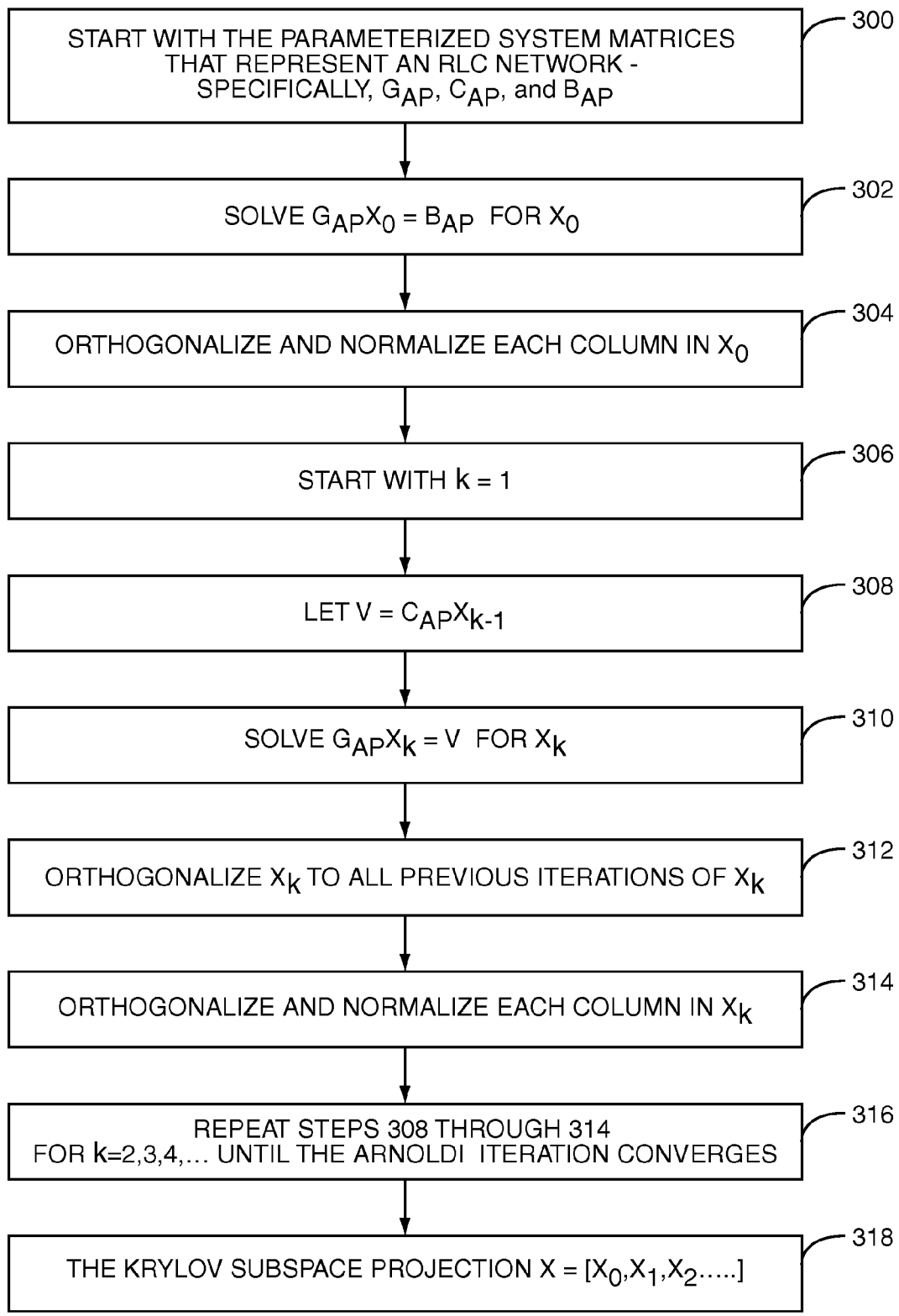

FIG. 4 shows details of a simplified Arnoldi iteration.

Figure 5:
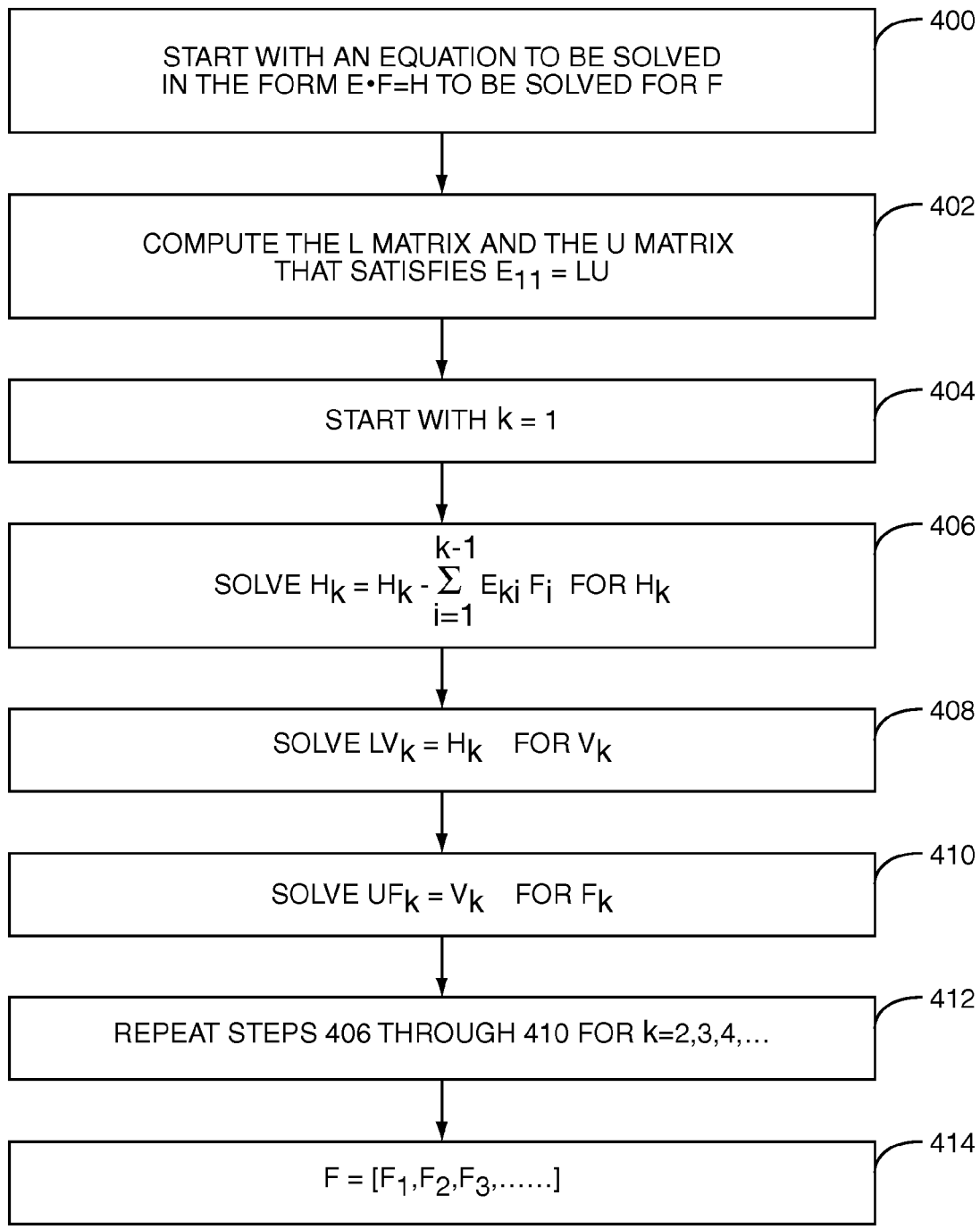

FIG. 5 shows details of a recursive method used as an iterative problem solver.

Figure 6:
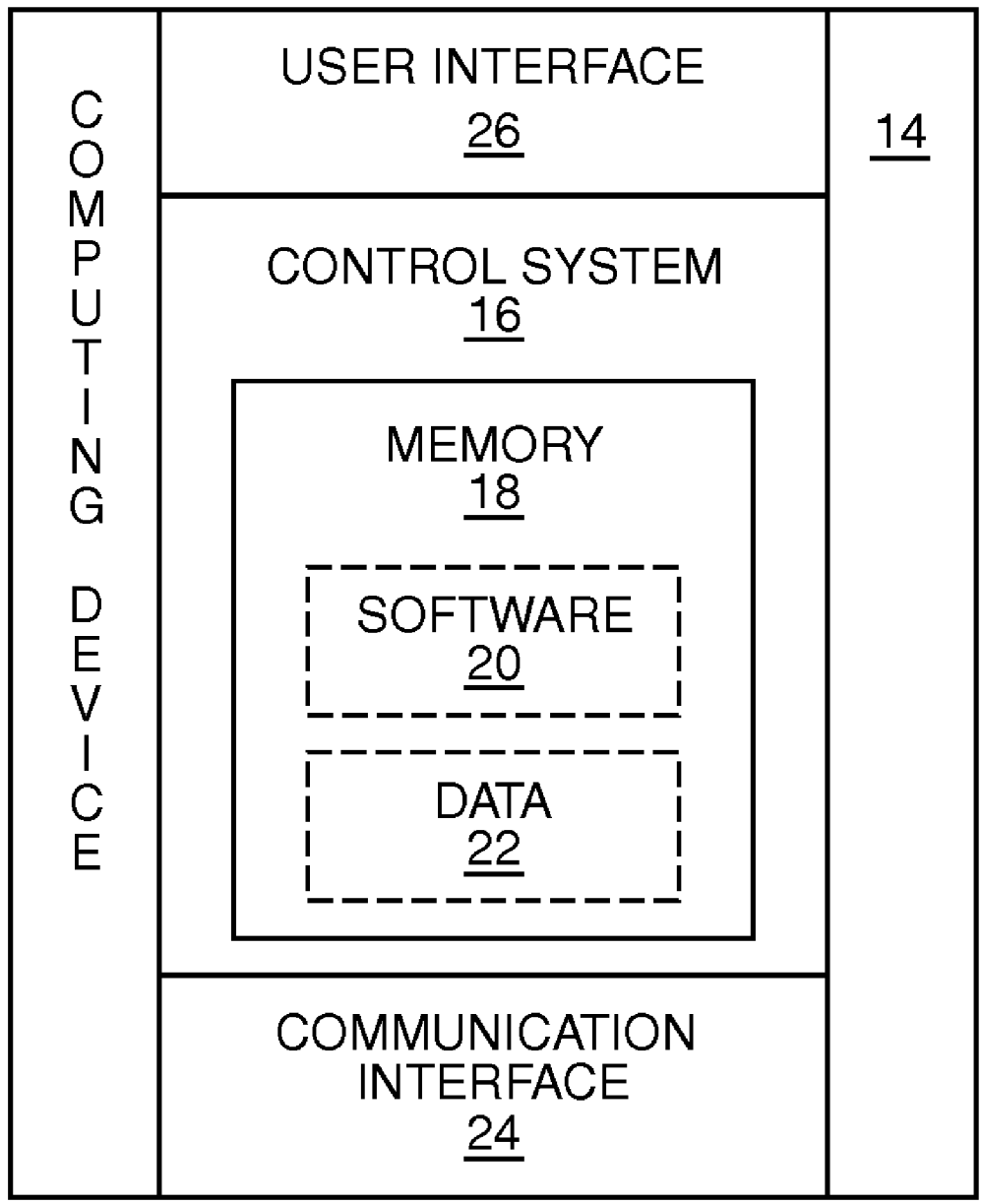

FIG. 6 shows a block representation of a computing device that is capable of providing the modeling of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a method and apparatus for creating a reduced-order IC interconnect model, which incorporates variations in interconnect process parameters including both inter-die and intra-die variations. The process parameters may include width and thickness of the metal interconnects. The method is based on mathematically representing an IC interconnect system, including mathematical interconnect process parameter terms, which are manipulated to facilitate simplification of an IC interconnect model. The IC interconnect model is then simplified by using a mathematical technique called state-space projection. Specifically, an IC interconnect system is represented with at least one modified nodal analysis equation (MNA) that is based on frequency, interconnect process parameters are added and substituted back into the MNA(s), terms with interconnect process parameters are explicitly matched. A state-space projection is created, which implicitly matches frequency terms. The state-space projection is used to create the reduced-order IC interconnect model. In one embodiment of the present invention, the interconnect system may be represented by more than one MNA equation. The interconnect process parameters may be added by creating a Taylor series expansion of each interconnect process dependent matrix in the MNA equation (s). The projection may include a Krylov subspace projection. The Krylov subspace projection may be created using an iterative method, such as an Arnoldi iteration.

Figure 1A:
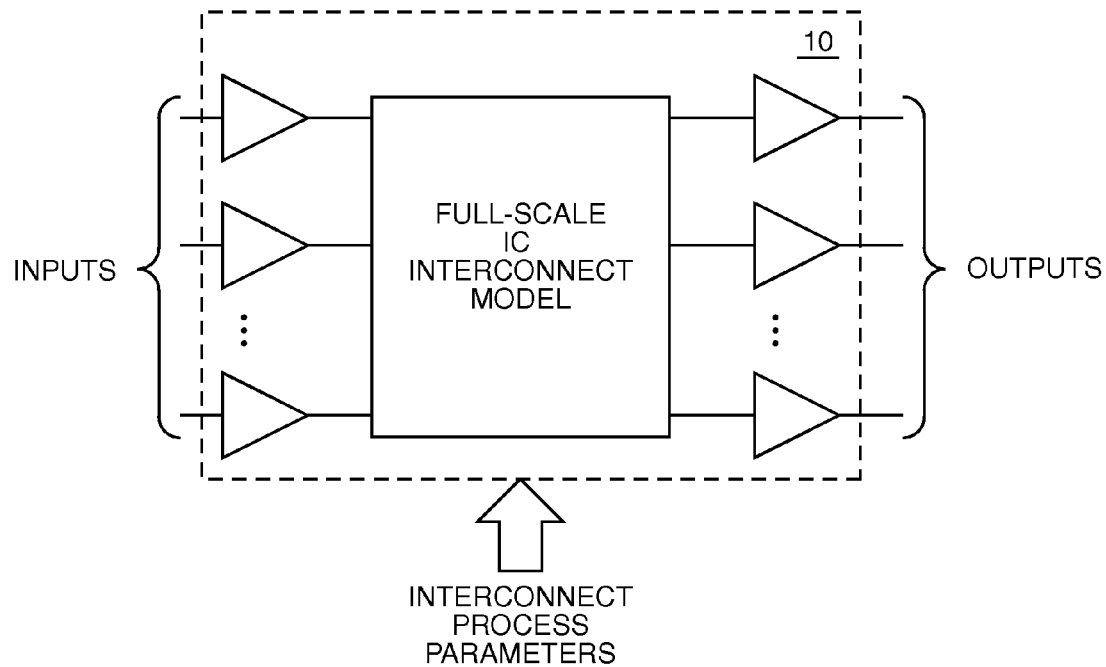
FIG. 1A shows a full-scale IC interconnect behavioral model with inputs and outputs.
Figure 1B:
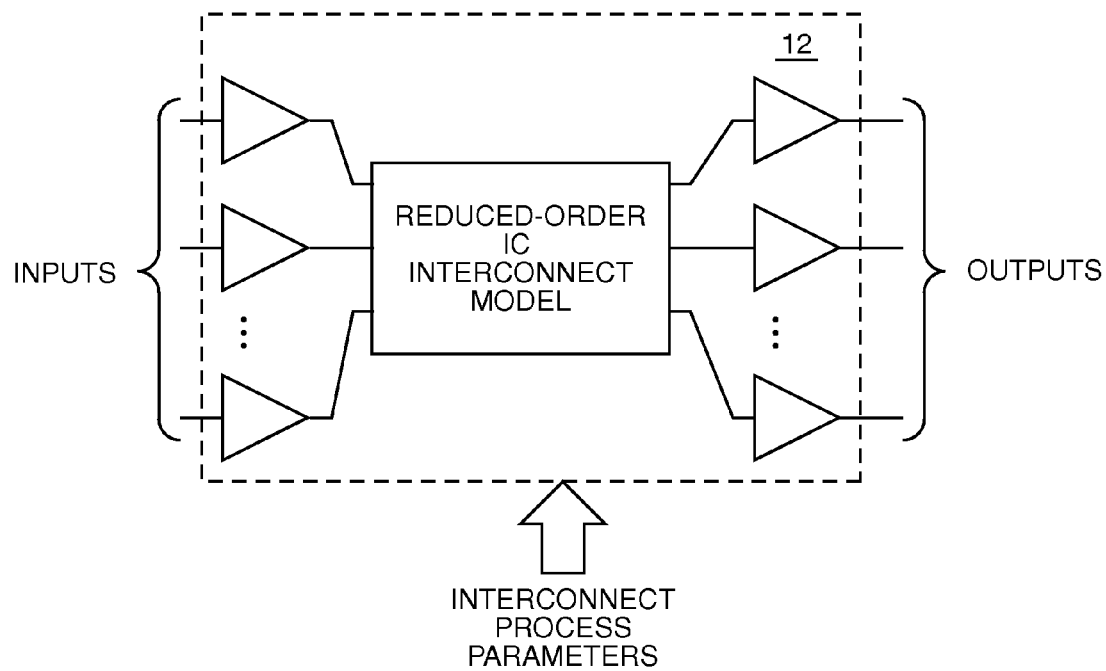
FIG. 1B shows a reduced-order IC interconnect behavioral model.

Model order-reduction is a technique for reducing the complexity of behavioral models of linear time invariant systems, while preserving input to output behavior, as much as possible. Before order reduction, the behavioral models can be quite large; however, they often contain many redundancies that can be eliminated. Since IC interconnect systems may be linear time invariant systems, the behavioral models of such systems may lend themselves to order-reduction. FIG. 1A shows a full-scale IC interconnect behavioral model 10 with model inputs INPUTS and model outputs OUTPUTS. Interconnect process parameters are incorporated in the model 10 to include variations of individual interconnect elements due to process variations. Order-reduction reduces the complexity of the full-scale IC interconnect behavioral model 10 to create a reduced-order IC interconnect behavioral model 12, as shown in FIG. 1B. Behavioral models that lend themselves to order-reduction typically express system behavior in the form of at least one differential equation. Often, such equation (s) are expressed in the generalized state-space form using vector equations as shown below:

$$x \in R^N \qquad \text{EQ. 1}$$

$$u \in R^n \qquad \text{EQ. 2}$$

$$y \in R^m \qquad \text{EQ. 3}$$

Where vector x is an element belonging to the real field R of dimension N. x is referred to as a state of the system and N is the order of the system. u is a vector-valued input to the system, where n is the number of system inputs. y is a vector-valued output from the system, where m is the number of system outputs.

$$Ax = Bu \qquad \text{EQ. 4}$$

$$y = Cx \qquad \text{EQ. 5}$$

where A is called a system matrix, B is called an input matrix, and C is called an output matrix.

FIG. 2 illustrates one embodiment of the present invention by presenting a method for creating the reduced-order IC interconnect behavioral model 12 of FIG. 1B. The interconnect elements in an IC interconnection system are represented with at least one modified nodal analysis equation (MNA) that is based on frequency (step 200). The MNA(s) may be in the form of at least one state-space equation. The MNA(s) contain at least one system matrix that is dependent upon frequency, and at least one system matrix that is dependent upon interconnect process parameters. The process parameters may include, but are not limited to length, width, thickness, diameter, resistivity, or any combination thereof of the metal interconnects. In addition, the interconnect process parameters may include, but are not limited to length, width, thickness, diameter, resistivity, permittivity, permeability, or any combination thereof of the materials surrounding the metal interconnects. A series expansion is performed for each system matrix of the MNA(s) that is dependent upon interconnect process parameters (step 202). In one embodiment of the present invention, the series expansion is a Taylor series expansion. A Taylor series expansion of a function f(x) may be expressed as $f(x) = \Sigma (f^{(n)}(a)/n!)(x-a)^n$ from $n=0$ to $n=\infty$, where x includes interconnect process parameters, n! is the factorial of n, and $f^{(n)}(a)$ denotes the $n^{th}$ derivative of f(x) at the point a. The series expansion(s) of step 202 for each system matrix are substituted into the MNA(s) to create at least one parameterized modified nodal analysis equation (PMNA) (step 204). Interconnect process parameter terms in the PMNA(s) are explicitly matched by identifying and combining terms with common interconnect process parameters to create at least one parameterized system equation (PSE) (step 206).

In one embodiment of the present invention, at least one system matrix in the PSE(s) is a block lower triangular matrix. In a block lower triangular matrix, entries on the upper side of a block diagonal are all zero. At least one system matrix in the PSE(s) contains frequency terms. Block lower triangular matrices are easier to manipulate than fully populated matrices of the same size. The frequency terms are implicitly matched by creating a state-space projection using the PSE(s) (step 208). In creating the state-space projection, individual elements in a PSE block lower triangular matrix are mathematically manipulated. By mathematically manipulating individual elements instead of the entire matrix, the creation of the projection is simplified. Many order-reduction methods are projection-based. Creating a projection can be illustrated as projecting the state-space of the behavioral model onto two subspaces S1 and S2. S1 is a result of projecting the state of the behavioral model. S2 is the residual from the projection. In one embodiment of the present invention, the projection is a Krylov subspace projection. A Krylov subspace is the subspace spanned by vectors $b, Ab, A^2 b, \ldots, A^{n-1}b$, where b is an n-vector, and A is an n-by-n matrix. Starting with b, Ab is then computed, which is multiplied by A to get $A^2 b$, and so on. The act of multiplying by A is repeated until $A^{n-1}b$ is calculated. In one embodiment of the present invention, an Arnoldi iteration may be used to create the projection. An Arnoldi iteration is an iterative method of creating a state-space projection wherein each iteration uses results from previous iterations. A recursive algorithm may be used to solve equations for each iteration within the Arnoldi iteration. The reduced-order IC interconnect behavioral model 12 (FIG. 1B) is created using the projection from step 208 (step 210) by creating reduced-order matrices, which are then substituted back into the original MNA(s).

In one embodiment of the present invention, MNAs may represent a resistor inductor capacitor (RLC) network. In another embodiment of the present invention, MNAs may represent a resistor capacitor (RC) network.

FIG. 3 shows an exemplary embodiment of the present invention, wherein an IC interconnect system is represented with an RLC network having MNAs of the form:

$$x \in R^N \qquad \text{EQ. 6}$$

$$u \in R^n \qquad \text{EQ. 7}$$

$$y \in R^m \qquad \text{EQ. 8}$$

$$G \in R^{N \times N} \qquad \text{EQ. 9}$$

$$C \in R^{N \times N} \qquad \text{EQ. 10}$$

$$B \in R^{N \times n} \qquad \text{EQ. 11}$$

$$L \in R^{N \times m} \quad \text{EQ. 12}$$

$$(G+sC)x=Bu \quad \text{EQ. 13}$$

$$y=L^T x \quad \text{EQ. 14}$$

where vector x is an element belonging to the real field R of dimension N. x is again referred to as the state of the system and N is the order of the system. Vector u is an element belonging to the real field R of dimension n, and represents the inputs to the system, where n is the number of system inputs. Vector y is an element belonging to the real field R of dimension m, and represents the outputs from the system, where m is the number of system outputs. G and C are system matrices belonging to the real field R of dimension N×N. B is a system matrix belonging to the real field R of dimension N×n. L is a system matrix belonging to the real field R of dimension N×m. $L^T$ is the transpose of L and belongs to the real field R of dimension m×N. s represents frequency (step 200A). A Taylor series expansion is created for each system matrix in the MNAs that is dependent upon interconnect process parameters. G, C, and x are dependent upon interconnect process parameters; therefore, each of these matrices is represented as Taylor series expansions as shown below:

$$G(\varepsilon_1, \ldots, \varepsilon_K) = \sum_{i1=0}^{+\infty} \ldots \sum_{iK=0}^{+\infty} G_{i1,\ldots,iK} \cdot \varepsilon_1^{i1} \ldots \varepsilon_K^{iK} \quad \text{EQ. 15}$$

$$C(\varepsilon_1, \ldots, \varepsilon_K) = \sum_{i1=0}^{+\infty} \ldots \sum_{iK=0}^{+\infty} C_{i1,\ldots,iK} \cdot \varepsilon_1^{i1} \ldots \varepsilon_K^{iK} \quad \text{EQ. 16}$$

$$x(\varepsilon_1, \ldots, \varepsilon_K, s) = \sum_{i1=0}^{+\infty} \ldots \sum_{iK=0}^{+\infty} x_{i1,\ldots,iK}(s) \cdot \varepsilon_1^{i1} \ldots \varepsilon_K^{iK} \quad \text{EQ. 17}$$

$\varepsilon_1$ through $\varepsilon_K$ include interconnect process parameters (step 202A). Each Taylor series expanded system matrix is substituted into the MNAs to create PMNAs (step 204A); therefore, EQ. 15 and EQ. 16 are substituted into EQ. 13, and EQ. 17 is substituted into EQ. 14. After the substitutions, the interconnect process parameter terms in the PMNAs are explicitly matched by identifying and combining terms with common interconnect process parameters to create parameterized system equations (step 206A) as shown below:

$$(G_{0,\ldots,0} + sC_{0,\ldots,0}) \cdot x_{0,\ldots,0} = B \cdot u$$
$$\varepsilon_1 \cdot (G_{1,\ldots,0} + sC_{1,\ldots,0}) \cdot x_{0,\ldots,0} + \varepsilon_1 \cdot (G_{0,\ldots,0} + sC_{0,\ldots,0}) \cdot x_{1,\ldots,0} = 0$$
$$\vdots$$
$$\varepsilon_K \cdot (G_{0,\ldots,1} + sC_{0,\ldots,1}) \cdot x_{0,\ldots,0} + \varepsilon_K \cdot (G_{0,\ldots,0} + sC_{0,\ldots,0}) \cdot x_{0,\ldots,1} = 0$$
$$\vdots$$
$$y = L^T \cdot x = \sum_{i1=0}^{+\infty} \sum_{iK=0}^{+\infty} L^T \cdot x_{i1,\ldots,iK} \cdot \varepsilon_1^{i1} \ldots \varepsilon_K^{iK}$$

For clarity, the parameterized system equations may be presented as follows:

$$(G_{AP}+sC_{AP}) \cdot x_{AP} = B_{AP} \cdot u \quad \text{EQ. 18}$$

$$y = L^T_{AP} \cdot x_{AP} \quad \text{EQ. 19}$$

where—

$$G_{AP} = \begin{Bmatrix} G_{0,\ldots,0} & 0 & \ldots & 0 & \ldots \\ G_{1,\ldots,0} & G_{0,\ldots,0} & \ldots & 0 & \ldots \\ \vdots & \vdots & \ddots & \vdots & \ldots \\ G_{0,\ldots,1} & 0 & \ldots & G_{0,\ldots,0} & \ldots \\ \vdots & \vdots & \vdots & \vdots & \vdots \end{Bmatrix}$$

$$C_{AP} = \begin{Bmatrix} C_{0,\ldots,0} & 0 & \ldots & 0 & \ldots \\ C_{1,\ldots,0} & C_{0,\ldots,0} & \ldots & 0 & \ldots \\ \vdots & \vdots & \ddots & \vdots & \ldots \\ C_{0,\ldots,1} & 0 & \ldots & C_{0,\ldots,0} & \ldots \\ \vdots & \vdots & \vdots & \vdots & \vdots \end{Bmatrix}$$

$$x_{AP} = \begin{Bmatrix} x_{0,\ldots,0} \\ x_{1,\ldots,0} \\ \vdots \\ x_{0,\ldots,1} \\ \vdots \end{Bmatrix} \quad B_{AP} = \begin{Bmatrix} B \\ 0 \\ \vdots \\ 0 \\ \vdots \end{Bmatrix} \quad L_{AP} = \begin{Bmatrix} L \\ \varepsilon_1 L \\ \vdots \\ \varepsilon_K L \\ \vdots \end{Bmatrix}$$

The frequency terms are implicitly matched by creating a Krylov subspace projection X from the PSEs using a recursive Arnoldi iteration (step 208A). A recursive Arnoldi iteration uses a recursive method to solve equations within an Arnoldi iteration. A reduced-order IC interconnect model is created from the Krylov subspace projection (step 210A) by first creating reduced-order system matrices $G_{AP}$, $C_{AP}$, $B_{AP}$, and $L_{AP}$ using the Krylov subspace projection X and the parameterized system matrices as follows:

$$G_{AP} = X^T G_{AP} X \quad \text{EQ. 20}$$

$$C_{AP} = X^T C_{AP} X \quad \text{EQ. 21}$$

$$B_{AP} = X^T B_{AP} \quad \text{EQ. 22}$$

$$L_{AP} = X^T L_{AP} \quad \text{EQ. 23}$$

The reduced order system matrices are then substituted back into EQ. 13 and EQ. 14 to create the reduced-order IC interconnect model as follows:

$$(G_{AP}+sC_{AP}) \cdot x = B_{AP} \cdot u \quad \text{EQ. 20}$$

$$y = L^T_{AP} \cdot x \quad \text{EQ. 21}$$

FIG. 4 shows details of a simplified Arnoldi iteration. Starting with the parameterized system matrices that represent an RLC network, which are $G_{AP}$, $C_{AP}$, and $B_{AP}$ (step 300), the equation $G_{AP} x_0 = B_{AP}$ is solved for $x_0$ (step 302) to obtain an initial projection sub-matrix. Each column in $x_0$ is orthogonalized and normalized (step 304). Start with k=1 (step 306). The equation $V = C_{AP} X_{k-1}$ is computed (step 308) for use in step 310. The equation $G_{AP} x_k = V$ is solved for $x_k$ (step 310). $x_k$ is orthogonalized to all previous versions of $x_k$ (step 312). Each column in $x_k$ is orthogonalized and normalized to create a $k^{th}$ projection sub-matrix (step 314). Steps 308 through 314 are repeated for incrementing values of k starting with k=1, until the value of $x_k$ in the Arnoldi iteration converges (step 316). The Krylov subspace projection X is constructed from all of the projection sub-matrices, or mathematically X=[$x_0$, $x_1$, $x_2$, . . . ] (step 318).

FIG. 5 shows details of a recursive method used as an iterative problem solver for performing step 302 and step 310 of FIG. 4. The equations of steps 302 and 310 can be put in the form of E·F=H and solved for F (step 400). The expansion of this equation can be put in the form:

$$\begin{pmatrix} E_{11} & 0 & 0 & \dots \\ E_{21} & E_{11} & 0 & \dots \\ E_{31} & E_{32} & E_{11} & \dots \\ \vdots & \vdots & \vdots & \ddots \end{pmatrix} \begin{pmatrix} F_1 \\ F_2 \\ F_3 \\ \vdots \end{pmatrix} = \begin{pmatrix} H_1 \\ H_2 \\ H_3 \\ \vdots \end{pmatrix}.$$

Since the E matrix is a lower block triangular matrix, and since the diagonal contains only the sub-matrix $E_{11}$, the iterative problem solver iteratively solves a number of small equations using the sub-matrix $E_{11}$. A lower triangular matrix L and an upper triangular matrix U can be created that satisfy the equation $E_{11}$=LU (step 402), which can be illustrated by the form:

$$\begin{bmatrix} a_{11} & a_{12} & a_{13} \\ a_{21} & a_{22} & a_{23} \\ a_{31} & a_{32} & a_{33} \end{bmatrix} = \begin{bmatrix} l_{11} & 0 & 0 \\ l_{12} & l_{22} & 0 \\ l_{13} & l_{23} & l_{33} \end{bmatrix} \begin{bmatrix} u_{11} & u_{12} & u_{13} \\ 0 & u_{22} & u_{23} \\ 0 & 0 & u_{33} \end{bmatrix}$$

Start with k=1 (step 404). The equation $$H_k = H_k - \sum_{i=1}^{k-1} E_{ki} F_i$$

is solved for $H_k$ (step 406). The equation $LV_k=H_k$ is solved for $V_k$ (step 408). The equation $UF_k=V_k$ is solved for $F_k$ (step 410). Steps 406 through 410 are repeated for incrementing values of k, starting with k=1 (step 412). The matrix F is then constructed from all of the sub-matrices $F_1, F_2, F_3, \ldots$ (step 414).

In certain embodiments of the present invention, the interconnect system may include on-chip interconnects, off-chip interconnects, or both. The off-chip interconnect may include at least one interconnect between a first IC die and at least one additional die. The on-chip interconnects may include at least one interconnect between two connection points on the same IC die. The off-chip interconnects may include metallic bonding wires. The off-chip interconnects may include metallic wires on a printed circuit board (PCB). At least one off-chip interconnect may be provided by a substrate attached to at least one IC die. An IC die may include at least one metallic layer, which may provide at least one on-chip interconnect. An IC die may include at least one semiconductor layer, which may provide at least one on-chip interconnect. The interconnect system may have at least one impedance, which may have at least one resistance, capacitance, inductance, or any combination thereof.

With reference to FIG. 6, a block representation of a computing device 14 that is capable of providing the modeling of the present invention is illustrated. The computing device 14 may include a control system 16 having sufficient memory 18 for the software 20 and data 22 required for the modeling as described above. The control system 16 is associated with a communication interface 24 to facilitate communications with other devices and a user interface 26, which facilitates interaction with the user. The user interface 26 may include a microphone and speaker to facilitate voice communications with the user, as well as a keypad and display to allow the user to input and view information. The parameter and related information required for modeling may be obtained via the communication interface 24 and the user interface 26. The modeling results may be provided to the user via the user interface 26 or sent to other devices via the communication interface 24.

Those skilled in the art will recognize improvements and modifications to the preferred embodiments of the present invention. All such improvements and modifications are considered within the scope of the concepts disclosed herein and the claims that follow.

What is claimed is:

1. A method for creating a reduced-order IC interconnect model comprising:
   representing an interconnect system of at least one integrated circuit (IC) die by at least one modified nodal analysis equation that is based on frequency, wherein the at least one modified nodal analysis equation comprises at least one system matrix;
   creating a series expansion for each system matrix that is dependent on interconnect process parameters; and
   substituting the series expansion for each system matrix that is dependent on interconnect process parameters into the at least one modified nodal analysis equation to create the at least one parameterized modified nodal analysis equation
   explicitly matching interconnect process parameter terms in the at least one parameterized modified nodal analysis equation to create at least one parameterized system equation;
   creating a projection from the at least one parameterized system equation to implicitly match frequency terms;
   creating the reduced-order IC interconnect model using the projection.

2. The method of claim 1 wherein the interconnect system has at least one impedance.

3. The method of claim 2 wherein the at least one impedance further comprises at least one of a group consisting of a resistance, a capacitance, and an inductance.

4. The method of claim 1 wherein the interconnect system comprises off-chip connections.

5. The method of claim 4 wherein the off-chip connections comprise at least one of a group consisting of metallic bonding wires and metallic wires on a printed circuit board.

6. The method of claim 4 wherein at least one of the at least one IC die is attached to a substrate, wherein the substrate provides at least one of the off-chip connections.

7. The method of claim 4 wherein the at least one IC die comprises a first IC die and a second IC die, wherein at least one of the off-chip connections connects the first IC die to the second IC die.

8. The method of claim 1 wherein the interconnect system comprises on-chip connections.

9. The method of claim 8 wherein at least one of the at least one IC die comprises at least one metallic layer, wherein the at least one metallic layer provides at least one of the on-chip connections.

10. The method of claim 1 wherein the interconnect system comprises on-chip connections and off-chip connections.

11. The method of claim 1 wherein the at least one modified nodal analysis equation represents an impedance network containing resistive elements, capacitive elements, and inductive elements.

12. The method of claim 1 wherein the series expansion for each system matrix that is dependent on interconnect process parameters comprises a Taylor series expansion.

13. The method of claim 1 wherein the interconnect process parameters comprise at least one of a group consisting of length, width, thickness, diameter, resistivity, permittivity, and permeability.

14. The method of claim 1 wherein the interconnect process parameters pertain to at least one of interconnect elements and elements surrounding interconnect elements.

15. The method of claim 1 wherein the projection further comprises a Krylov subspace projection.

16. The method of claim 1 wherein the implicitly matching frequency terms by creating a projection from the parameterized system equation comprises an Arnoldi iteration.

17. The method of claim 16 wherein the Arnoldi iteration further comprises a recursive method used as an iterative problem solver.

18. The method of claim 1 wherein the parameterized system equation comprises at least one parameterized system matrix, wherein the at least one parameterized system matrix comprises matrix entries that are zero on one side of a block diagonal.

19. The method of claim 1 wherein the explicitly matching interconnect process parameter terms further comprises identifying and combining terms with common interconnect process parameters to create the at least one parameterized system equation.

20. A computing device comprising:
an interface adapted to receive modeling information;
a control system adapted to create a reduced-order integrated circuit (IC) interconnect model based on software, the modeling information, and data, wherein the reduced-order IC interconnect model is based on:
at least one modified nodal analysis equation that is based on frequency and comprises at least one system matrix, wherein the at least one modified nodal analysis equation represents an interconnect system of at least one IC die;
a series expansion for each system matrix that is dependent on interconnect process parameters; and
the at least one parameterized modified nodal analysis equation, which is based on a substitution of the series expansion for each system matrix that is dependent on interconnect process parameters into the at least one modified nodal analysis equation;
at least one parameterized system equation that is based on explicitly matched interconnect process parameter terms in at the least one parameterized modified nodal analysis equation; and
a projection comprising implicitly matched frequency terms, wherein the projection is based on the at least one parameterized system equation.

* * * * *